Patented May 19, 1942

2,283,604

UNITED STATES PATENT OFFICE 2,283,604

METHOD OF MAKING SPONGE RUBBER

Marion M. Harrison, Akron, Ohio, assignor to The B. F. Goodrich Company, New York, N. Y., a corporation of New York No Drawing. Application January 25, 1940, Serial No. 315,622

3 Claims. (Cl. 260—723)

This invention relates to a method of making sponge rubber from an aqueous dispersion of rubber, such as natural rubber latex.

It is the purpose of this invention to produce a sponge rubber from latex in which the cells of the sponge are formed by means of an inert gas. According to a preferred method of this invention the latex composition is subjected to Freon gas (dichloro di fluoro methane) under such conditions of temperature and pressure that the gas has less volume than it would ordinarily have at atmospheric pressure and normal room temperature. This procedure causes the gas to dissolve in or be absorbed by the latex. For simplicity, it will be considered that the gas is truly dissolved in the latex, it being understood, however, that terms implying solution include absorption, adsorption, and other phenomena which may enter into the association of the gas with the latex. After holding the above conditions for a time sufficient to dissolve an appreciable amount of the inert gas, the conditions of temperature and/or pressure are changed so as to reduce the solubility of the Freon. This change in solubility is brought about by either lowering the pressure, raising the temperature, or both. This reduction in solubility causes the gas to form in small cells throughout the latex thereby resulting in an expanded but still flowable latex composition. The expanded latex composition is then converted into the desired shape by pouring into molds, spreading on a base or otherwise shaping it. The expanded latex is then set to an irreversible gel, thereupon forming a sponge. After the expanded latex is coagulated, it may be vulcanized.

It has heretofore been generally considered that to use a gas in making sponge rubber from latex, the gas should be of a relatively high solubility in latex. I have found, however, that a gas of lesser solubility produces a better sponge. The Freon used in this invention is much less soluble than any of the ordinary gases, such as carbon dioxide, formerly used in making sponge rubber from latex. This lesser solubility leads to the formation of a sponge with smaller, more evenly sized bubbles or cells and results in an improved sponge. It is also true that many of the prior gases, such as carbon dioxide, tend to coagulate latex. This difficulty is not encountered with Freon.

The compounded latex used in this invention preferably should contain a stabilizing agent such as soap, a delayed coagulant such as sodium silico-fluoride, and the usual vulcanizing materials, in addition to any other desired compounding ingredients, the use of all of which is well understood in the art.

One embodiment of this invention is to subject compounded latex in an enclosed tank to Freon gas under pressure, preferably, until the latex is saturated with the gas. Ordinarily this will require only about ten to twenty minutes although longer periods may be required to saturate large volumes of latex. After the latex is saturated with the gas the pressure is suddenly released causing the Freon to flash out of solution thereby forming minute bubbles throughout the latex. The resulting expanded latex can be molded, spread on a cloth, or similarly handled.

The charging of the latex with Freon has been carried out at various pressures ranging from 25 to 100 lbs. per sq. in. but for practical purposes the pressure need not exceed 60 or 65 lbs. per sq. in. although lower pressures can be used. With Freon at some pressures that might be used it will be necessary to control the temperature with the pressure so that the Freon will not liquify. The temperature may be varied with the pressure. For instance, immediately upon charging the latex with Freon under pressure the temperature may be lowered to any point just above liquification of the gas, and then prior to release of the pressure the temperature may be raised. It is also possible to charge the latex by lowering the temperature and keeping the pressure constant. The expansion is then brought about by suddenly raising the temperature, thereby releasing the gas from solution and forming the small bubbles or cells.

The term "sponge rubber" has been used in a generic sense to include porous rubber products in general, whether alone or associated with other materials.

The term "aqueous dispersion of a rubber material" appearing in the claims is used broadly to designate any naturally occurring or artificially prepared dispersion of natural or synthetic rubber including specifically caoutchouc, gutta percha, balata, Neoprene, Thiokol, and poly isobutylene, dispersed in an aqueous dispersion medium. Such dispersions may be concentrated, diluted, thickened, thinned or otherwise prepared for use and may contain any of the usual stabilizing, creaming, vulcanizing, compounding or other conditioning agents ordinarily employed in rubber dispersions, particularly in the manufacture of rubber sponge. An aqueous dispersion of a rubber material that has been prevulcanized or partly prevulcanized may be used in this invention.

Many modifications and changes in the procedure hereinabove described may be employed in practicing the invention without departing from the spirit and scope of the invention as defined by the appended claims.

I claim:

1. The method of making sponge rubber which comprises dissolving dichloro difluoro methane gas in an aqueous dispersion of a rubber material, then varying a physical condition affecting the solubility of the dichloro difluoro methane gas in the aqueous dispersion sufficiently to deposit gas from the aqueous dispersion in the form of small bubbles and to produce an expanded dispersion, and thereafter setting the expanded dispersion to an irreversible condition.

2. The method of making sponge rubber which comprises dissolving dichloro difluoro methane gas in an aqueous dispersion of a rubber material under such conditions of temperature and pressure that the dichloro difluoro methane occupies a smaller volume than it would ordinarily occupy at normal room temperature and atmospheric pressure, then altering at least one condition of temperature or pressure in order to deposit the dichloro difluoro methane gas from solution in the form of small bubbles to produce an expanded dispersion, and thereafter setting the expanded dispersion to an irreversible gel.

3. The method of making sponge rubber which comprises subjecting an aqueous dispersion of a rubber material in a closed container to dichloro difluoro methane gas under a pressure substantially higher than the surrounding atmospheric pressure and thereafter releasing the pressure in the container whereby the pressure on the dispersion is lowered to atmospheric and the dispersion is expanded to a porous state by the dichloro difluoro methane.

MARION M. HARRISON.